H. A. McCALLUM.
VIEW FINDER FOR CAMERAS.
APPLICATION FILED MAR. 16, 1918.
1,340,618.
Patented May 18, 1920.
2 SHEETS—SHEET 1.
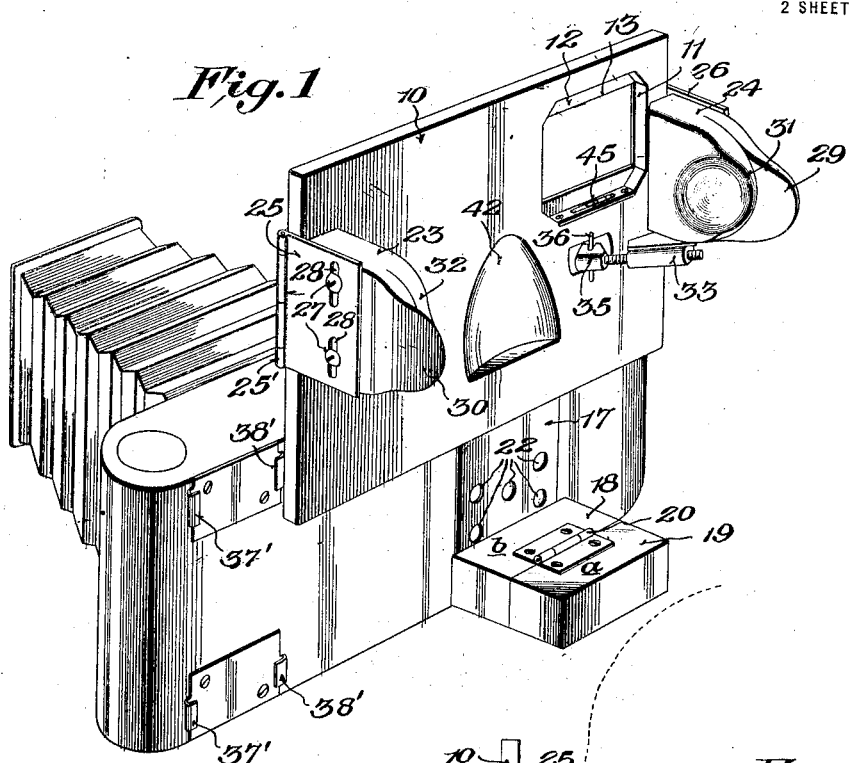
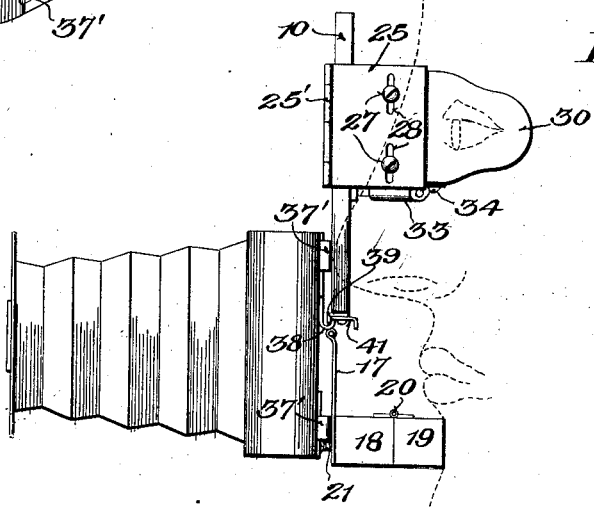
Inventor
Herbert A. McCallum H. A. McCALLUM.
VIEW FINDER FOR CAMERAS.
APPLICATION FILED MAR. 16, 1918.
1,340,618.
Patented May 18, 1920.
2 SHEETS—SHEET 2.
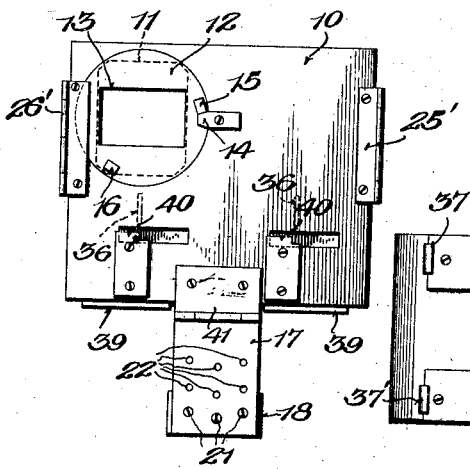
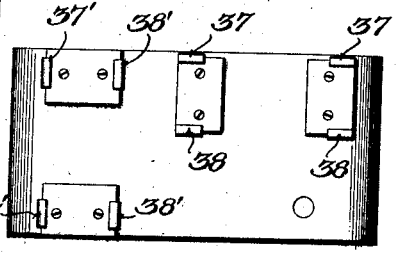
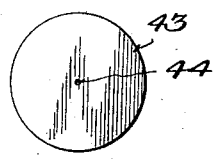
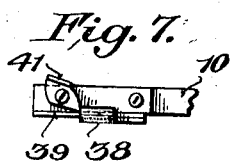
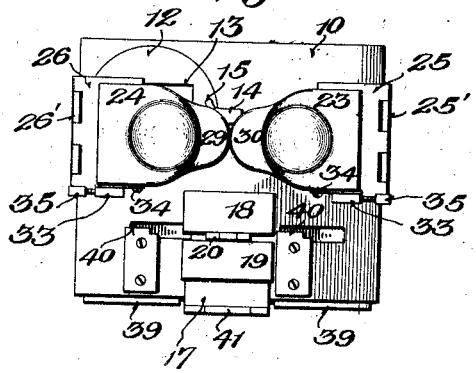
Inventor
Herbert A. McCallum
By Foster Freeman Watson & Coit
Attorneys

UNITED STATES PATENT OFFICE.

HERBERT A. McCALLUM, OF YONKERS, NEW YORK.

VIEW-FINDER FOR CAMERAS.

1,340,618. Specification of Letters Patent. Patented May 18, 1920.

Application filed March 16, 1918. Serial No. 222,856.

*To all whom it may concern:*

Be it known that I, HERBERT A. McCALLUM, a citizen of the United States, and residing at Yonkers, county of Westchester, State of New York, have invented certain new and useful Improvements in View-Finders for Cameras, of which the following is a specification.

The present invention relates to cameras and more particularly to a view finder therefor.

The principal objects of the invention are to provide a view finder which has no mirrors or lenses; to provide a finder secured to a camera and adapted to rest against the head of the observer so that movement of the head in seeking the desired view automatically points the camera; to provide a finder by means of which the observer sees only the objects that are in the field of the camera; and to provide means in connection with the finder which steadies the camera so that time exposures may be made with the type of camera which is adapted to be held in the hands. Other objects and features of novelty will be apparent from the description taken in connection with the drawings in which:

Figure 1 is a rear perspective view of a finder constructed in accordance with this invention secured to a camera;

Fig. 2 is a side elevation of the finder and camera showing the finder in operative position resting against the head of the observer, the latter being shown in dotted lines;

Fig. 3 is a front elevation of the finder;

Fig. 4 is a rear elevation of the camera showing the means for supporting the finder;

Fig. 5 is a front elevation of the finder showing the parts nested on the front face thereof;

Fig. 6 is an elevation of a disk adapted to be used in adjusting the finder; and Fig. 7 is a bottom plan view of a detail.

The invention is shown in connection with an extensible pocket camera of a well known type, but it is to be understood that the invention is not limited to use in connection with such a camera but may be attached to any type including moving picture cameras and cameras supported on tripods. As shown, the finder comprises a support shown as a plate 10 formed with an aperture 11, the front edges of which are rabbeted to provide a seat for a disk 12 formed with an aperture 13, this latter aperture being similar in outline to the picture taken by the camera. The camera with which the present finder is illustrated is adapted to take an oblong picture and it will be observed that the aperture 13 is of similar shape. The disk 12 is seated on the plate so that it may rotate from the position illustrated in Fig. 3 to a position in which the long dimension of the aperture is vertical. In order to properly hold the disk in either one of these two positions, a stop 14 is secured to the plate and extends over the front of the disk into the path of the two abutments 15 and 16, these abutments being positioned on the disk so that when the abutment 15 is in contact with the stop 14, the aperture will be positioned with the long dimension thereof horizontal and when the abutment 16 is in contact with the stop 14 the long dimension of the aperture will be vertical. A plate 17 is hinged to the lower edge of the plate 10 and carries an abutment consisting of the two pieces 18 and 19 joined together by a hinge 20. The piece 18 is secured to the plate 17 in any suitable manner as by means of the screws 21. If desired the plate 17 may be provided with additional holes 22 so that the piece 18 may be secured to said plate in different positions. It is desirable to provide means for adjusting the position of the pieces 18 and 19 relative to the camera and for this purpose an adjustable member is interposed between the plate 17 and the back of the camera. As shown, one of the screws 21 is arranged to perform this function. As previously stated, the finder is adapted to rest against the head of the observer and for this purpose the pieces 18 and 19 constitute what may be termed the lower abutment as the piece 19 is preferably positioned so as to contact with some lower part of the head such as upper or lower lip, the chin or the teeth. In order to prevent lateral movement of the finder with respect to the head of the observer and also hold the upper portion thereof in spaced relation to it, the lateral vertical edges of the support 10 are provided with the abutments or eye pieces 23 and 24, these abutments being mounted on the hinged plates 25 and 26 respectively for adjustment in a vertical direction as by means of the screw and slot connections 27 and 28. As shown the eye abutments have wing portions 29 and 30, respectively, which are adapted to rest against the outside of the bones forming the eye sockets, these abutments being thickened as at 31 and 32 to provide portions adapted to rest against the front edges of the said bones.

In order to hold the eye abutments in proper position a plate 33 is pivoted as at 34 to a lower edge of each of the eye pieces and a hook 35 is threaded through the plate 33, these hooks being adapted to engage bars 36 on the plate 10.

The finder may be removably secured to the camera in any desired manner. As shown the rear of the camera is provided with the opposed hooked flanges 37 and 38 and the finder has the flanges 39 at its lower edge adapted to coöperate with the flanges 38 on the camera and the flanges 40 adapted to slidably engage the flanges 37 on the camera. It will be observed that the flanges 39 have portions extending to the right of the flanges 40, as viewed in Fig. 3. Thus in mounting the finder on the camera the said portions of the flanges 39 are positioned in the hooked flanges 38 with the flanges 40 just at the right of the flanges 37. Then the finder is moved to the left so that the flanges 40 slide into the hooked flanges 37. The parts are then held in this position by means of the catch 42 pivoted to the lower edge of the plate 10 and adapted to be turned so that it engages the end of the left-hand flange 38 shown in Fig. 4. The means just described secures the finder to the camera for taking pictures with the long dimension thereof horizontal. If it is desired to take pictures in which the long dimension is vertical, then it is necessary to remove the finder and attach it to the camera in another position, the flanges 37' and 38' being provided for this purpose, these flanges being similarly located with respect to each other as the flanges 37 and 38 previously described. The finder is secured in this new position in the same manner as it was mounted on the flanges 37 and 38. Of course when the finder is secured to the camera by the flanges 37' and 38', the disk 12 is turned so that the long dimension of the aperture 13 is vertical.

When carrying the camera and finder it is desirable to have it take up as small a space as possible and for this purpose the abutments have been hinged to the plate 10 so that they can be nested against the front face thereof. Thus in order to nest the parts after the finder has been detached from the camera the piece 19 is swung on the hinge 20 until the face $a$ of block 19 is closely adjacent to the face $b$ of the block 18. Then the abutment with the plate 17 is swung on the hinge 41 until it rests against the front face of the plate 10, as shown in Fig. 5. The hooks 35 are then disengaged from the bars 36 and the eye abutments 23 and 24 are swung on their respective hinges 25' and 26' until they nest against the front face of the plate 10, as shown in Fig. 5. In using the finder it is only necessary to open up the abutments to their operative positions and attach the plate 10 to the rear of the camera. It will be seen that the abutments space the plate 10 and hence the view aperture 13 a fixed distance from one of the eyes of the observer. As shown, the aperture 13 is positioned so as to be in front of the right eye of the observer although an aperture in front of the left eye could be provided instead, if desired. Furthermore, the construction of the eye supports is such that the finder in resting against the head is held against lateral displacement.

It is often necessary to make adjustments in the finder to adapt it for use by particular individuals. Thus, although a recess 42 may be provided for the observer's nose, if the nose should contact with the plate the lower abutment may be projected slightly by turning the screw 21. If the wings 29 and 30 of the eye abutments are not properly spaced, then they may be adjusted toward or from each other by turning the left-hand hook 35 in its plate 33. It is desirable that the right-hand abutment be undisturbed and consequently the adjustment to properly position the wing 29 with respect to the wing 30 should be made by means of the left-hand hook as stated. In operation if it is found that the pictures taken show more or less than the view seen through the aperture 13, then another disk may be substituted with a different sized aperture, a plurality of disks being provided for this purpose. In order to determine if the center of the picture corresponds with the center of the view seen through the aperture 13, a disk 43 with a pin hole 44 therein is substituted for the disk 12. A small object is then viewed through the hole in the disk and the camera pointed so that this object is seen as though at the center of the hole. Then the picture is taken. If diagonals on the resulting picture intersect at the object, then the finder is properly adjusted so that the center of the view seen through the aperture corresponds with the central point of the field of the camera. If, however, the object on the negative looking at the latter on the smooth side thereof is above the intersection then the right eye piece as viewed in Fig. 1 should be moved upward slightly, say $\frac{1}{32}$ or $\frac{1}{16}$ of an inch. For this purpose the screws 27 are loosened and the abutment 24 moved upward relative to the hinge plate 26 the required distances whereupon the screws 27 are again tightened. If the object is below the intersection then the eye abutment 24 should be moved downward slightly. If the object appears at the right of the intersection of the diagonals the right hand hook 35 should be turned to screw the same out of the plate 33, say one turn. If the object is at the left of the intersection of the lines then the hook should be screwed in about one turn. Of course after adjusting the right hand eye abutment 24 it will be necessary to readjust the left hand eye abutment so that they will be properly spaced one with respect to the other.

In taking pictures of course it is desirable to have the camera horizontal and in order to determine this position a level 45 may be mounted at the lower edge of the aperture 11 in the plate where the bubble therein may readily be seen.

From the foregoing description it will be seen that a finder constructed in accordance with my invention has no glass such as mirrors or lenses, but on the contrary the view is seen directly by the eye. Furthermore the view finder discloses to the eye only the objects within the field of the camera so that the operator's attention may be devoted entirely to the view. Furthermore the manner of resting or positioning the finder against the head of the observer provides a very steady support for the camera so that if desired time exposures, even of a second's duration, and very easily of ⅕ of a second, may be taken. Again, it will be observed that the movement of the operator's head in seeking the objects to be photographed automatically points the camera. It is to be understood that the embodiment of the invention described above is merely illustrative and that the invention is not limited to the specific structure shown and described, as changes may be made therein within the scope of the appended claims.

Having thus described the invention what is claimed as new and desired to be secured by Letters Patent is:

1. In combination with a camera, a view finder including a support secured to the camera having a view aperture similar in outline to the exposure aperture in the camera, and means on said support constructed and arranged to bear against the operator's head to hold the support with the aperture in fixed relation to one of the operator's eyes.

2. In combination with a camera, a view finder including a support secured to the camera having a view aperture similar in outline to the exposure aperture in the camera; and means constructed and arranged to bear against the operator's head to hold the support with the aperture in fixed relation to one of the operator's eyes.

3. In combination with a camera, a view finder including a support having a view aperture similar in outline to the exposure aperture in the camera, and means constructed and arranged to hold the support with the aperture in fixed relation to one of the operator's eyes including an abutment adapted to rest against the lower part of the operator's face.

4. In combination with a camera, a view finder including a support having a view aperture similar in outline to the exposure aperture in the camera, means constructed and arranged to hold the support with the aperture in fixed relation to one of the operator's eyes including an abutment adapted to rest against the lower part of the operator's face, and abutments adapted to rest against the upper part of the operator's head to hold the support against movement toward and laterally thereof.

5. In combination with a camera, a view finder including a support having a view aperture similar in outline to the exposure aperture in the camera, means constructed and arranged to hold the support with the aperture in fixed relation to one of the operator's eyes including an abutment adapted to rest against the lower part of the operator's face, and abutments adapted to rest against the outer margins of the eye sockets to hold the support against movement toward and laterally of the operator's head.

6. In combination with a camera, a view finder including a support having a disk rotatably mounted thereon formed with an oblong view aperture similar to the exposure aperture in the camera, and means constructed and arranged to hold the support with the aperture in fixed relation to one of the operator's eyes and means for removably securing the support to the rear of the camera in either of two positions according to whether a picture is to be taken with the long dimension thereof horizontal or vertical.

7. As an article of manufacture, a view finder adapted to be secured to a camera including a support having a view aperture, an abutment hinged to the lower part of the support adapted to rest against the lower part of the operator's face, and an abutment hinged to each of the lateral edges of the support adapted to rest against the outer margin of an eye socket, said abutments adapted to be nested against the front face of the plate for transportation.

8. As an article of manufacture, a view finder adapted to be secured to a camera including a support having a view aperture, and a plurality of abutments hinged to the support constructed and arranged to bear against the operator's head to hold the support with the aperture in fixed relation to one of the operator's eyes, said abutments adapted to be nested against the front face of the support for transportation.

9. As an article of manufacture, a view finder adapted to be secured to a camera including a support having a view aperture, an abutment hinged to the lower part of the support adapted to rest against the lower part of the operator's face, and an abutment hinged to each of the lateral edges of said support and adjustable in at least one direction relative to said support adapted to rest against the upper part of the operator's head, said abutments adapted to be nested against the front face of the support for transportation.

10. In combination with a camera, a view finder including a support having a view aperture similar in outline to the exposure aperture in the camera, means constructed and arranged to hold the support with the aperture in fixed relation to one of the eyes of the operator including an abutment adapted to rest against the lower part of the operator's face, and means for adjusting the position of said abutment relative to the support.

11. In combination with a camera, a view finder secured to the rear of the camera and having means constructed and arranged to bear against the operator's head to hold the finder in fixed relation to one of the eyes of the operator.

12. In combination with a camera, a view finder secured to the rear of the camera, means constructed and arranged to bear against the operator's head to hold the finder in fixed relation to an eye of the operator and a level within the vision of said eye for determining when the camera is horizontal.

13. As an article of manufacture, a view finder adapted to be secured to a camera including a support having a view aperture, an abutment adapted to bear against the lower part of the operator's face, and a pair of abutments adapted to bear against the sides of the operator's head.

14. As an article of manufacture, a view finder adapted to be secured to a camera including a support having a view aperture, and means to hold the support with the aperture in fixed relation to one of the operator's eyes including abutments adapted to bear against opposite sides of the operator's head.

15. In combination with a camera, a view finder including a support having an oblong view aperture similar in outline to the exposure outline in the camera, means constructed and arranged to hold the support with the aperture in fixed relation to one of the operator's eyes and means securing the support to the rear of the camera in either of two positions according to whether a picture is to be taken with the long dimension horizontal or vertical.

In testimony whereof I affix my signature.

HERBERT A. McCALLUM.